Sept. 22, 1970  H. D. IVES ET AL  3,529,884

SCANNING POLYGON MIRROR ASSEMBLY

Filed April 3, 1968  2 Sheets-Sheet 1

INVENTORS
HENRY D. IVES
DONALD L. ROBERTS
ALFONSO L. HARRIS

BY Louis A. Kline
John T. Matlago
THEIR ATTORNEYS

Sept. 22, 1970　　　　H. D. IVES ET AL　　　　3,529,884
SCANNING POLYGON MIRROR ASSEMBLY Filed April 3, 1968　　　　　　　　　　　　　2 Sheets-Sheet 2

INVENTORS
HENRY D. IVES
DONALD L. ROBERTS
ALFONSO L. HARRIS

BY *Louis A. Kline*
*John J. Maclago*
THEIR ATTORNEYS

United States Patent Office 3,529,884
Patented Sept. 22, 1970

3,529,884
SCANNING POLYGON MIRROR ASSEMBLY
Henry D. Ives, Redondo Beach, Donald L. Roberts, Thousand Oaks, and Alfonso L. Harris, Los Angeles, Calif., assignors to The National Cash Register, Company, Dayton, Ohio, a corporation of Maryland
Filed Apr. 3, 1968, Ser. No. 718,417
Int. Cl. G02b 17/00
U.S. Cl. 350—7
6 Claims

ABSTRACT OF THE DISCLOSURE

A mirror assembly wherein flat faced mirror surfaces are provided on the sides of a polygon block which is rotatable about an axis of rotation passing through the center of the block for rotating the polygon sides containing the mirror surfaces within a common plane. A stationary light beam can be projected onto the moving mirror surfaces and reflected therefrom in such a manner as to produce a repetitive scanning movement of the reflected light beam. The polygon block is provided by a rigid core portion with edge segments that contain the mirror surfaces being connected to the core portion. The edge segments are individually attached to the core portion for pivotal movement about a pivotal axis. Means are provided for very fine adjustment of the pivotal position of the edge segments about said pivotal axis to adjust the position of the mirror surfaces thereon relative to the axis of rotation of the block.

BACKGROUND OF INVENTION

This invention relates to a polygon mirror assembly for producing a scanning motion of a light beam, e.g., a laser light beam, whereby a raster pattern can be formed to enable the recording of information on a recording medium.

It is known that a light beam, e.g., a laser beam, can be used to produce images on a recording medium. A laser beam recording system may include, for example, a means to cause the laser beam to very rapidly sweep across a recording medium as a series of scan lines forming a raster. A modulator controls the intensity of the light beam. Thus as the light beam is swept across the recording medium the variation in the light intensity will establish the desired image pattern recorded on the recording medium.

A way of producing the scanning motion of the laser beam is to direct the beam onto a rotating polygon, the peripheral surfaces of which are flat faced specularly reflective mirrors, with the reflection of the beam directed onto the recording medium. As each mirror successively intercepts the light beam, the reflected beam is swept across the recording medium. By moving the beam downwardly while it is being repeatedly swept across the recording medium, the desired raster pattern of the laser beam is achieved.

A system such as generally described above is disclosed in the commonly assigned U.S. patent application of Carl O. Carson et al. entitled, "Information Processing Systems Using Lasers," Ser. No. 549,281, filed May 11, 1966.

Laser recording systems having high resolution requirements such as contemplated by the present invention demand that the raster pattern produced by the scanning motion of the laser beam be very accurate. Thus it is important that each mirror face of the rotating polygon be very exactly positioned relative to the other mirror faces of the polygon. There are essentially three position considerations for each mirror. The first position consideration is the distance between the mirror surface and the axis of rotation. The second is referred to as the face angle and is the angle between adjacent mirror surfaces. The third is referred to as the pyramidal angle and is the angle formed between the axis of rotation and a line perpendicular to the mirror surface which passes through the axis of rotation.

Insofar as it is known, such polygon mirrors have heretofore been made from a single solid block of material that is machined to the desired dimensions. To obtain the desired accuracy in locating the mirror surfaces in any one of the three position considerations is difficult when using such an approach, and to achieve the desired accuracy for all three position considerations is extremely difficult. The cost for manufacturing a desired polygon mirror assembly may therefore be very high and, if any one of the mirror surfaces is damaged, the entire assembly may have to be replaced.

It is believed that the present invention provides a substantial advancement in laser beam recording in providing a mirror assembly wherein the mirror surfaces rather than being provided on the sides of a solid block are provided on edge segments that are individually adjustable relative to a solid core portion to a very fine degree of accuracy in one or more of the mentioned positions.

Although as mentioned above, all three of the position considerations are important in laser recording systems, depending on the application of the system, one of the position considerations may be of greater or lesser importance than the others. Thus, the simplest form of the invention may provide for adjustment in the more critical position considerations with the remaining, less critical position considerations being machined to the required acccuracy.

Very generally, in one of the simplest forms of the invention where the pyramidal angles is considered the more critical, a solid polygon block having a thickness that is sufficient to render it substanially rigid, is provided with an annular groove, i.e., reduced in cross section to form a connecting web, at a point between the outer edge and the inner or core portion of the block. Equally spaced radial cuts extending from the outer edge of the block inwardly to a point past the connecting web divided the outer peripheral portion of the block, i.e., from the connecting web outwardly, into the mentioned separate edge segments. Whereas the block is substantially rigid in the areas of full thickness, the connecting web permits resilient pivotal flexing of the edge segment about a fixed axis located at the connecting web. The core of the block has a bore adapted to receive a driven shaft for rotating the block about an axis of rotation. A flat faced mirror is provided on the outer side of each edge segment and an adjustable means is provided to pivot the edge segment relative to the rigid core to adjust the angle of the mirror surface relative to the axis of rotation.

The advantages of an apparatus constructed in accordance with the invention will become more apparent by reference to the following detailed description and drawings wherein.

Figure 1:
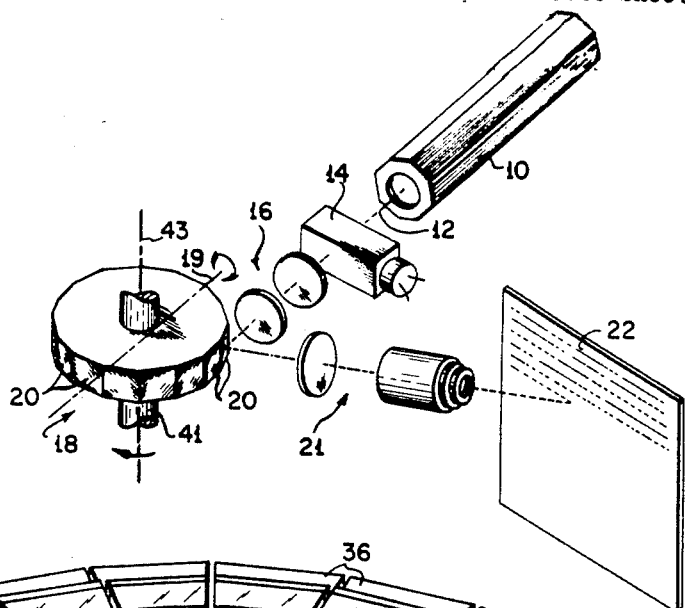
FIG. 1 is a schematic view illustrating a laser beam recording system wherein a rotatable polygon mirror assembly such as contemplated by the present invention is incorporated.

Referring to the recording system schematically shown in FIG. 1 of the drawings, a laser beam 12 is emitted from a laser 10 and is then passed through a modulator 14 and projected by a first projection lens system 16 onto a rotating polygon mirror assembly 18. The beam is reflected off the mirror surfaces 20 of the rotating polygon mirror assembly to produce a scanning movement of the laser beam that is directed by a second projection lens system 21 over the surface of a display media 22. Movement of the successive scan lines produced by the laser beam downward on the recording medium can be achieved by various means, as for example by tilting the mirror assembly about an axis 19. The above very general description of a recording system is meant to merely illustrate an application for the use of a rotating polygon mirror assembly such as contemplated by the present invention. A more specific disclosure of a laser recording system can be found in the above mentioned commonly assigned U.S. patent application of Carl O. Carlson et al., and also in the U.S. patent application of Carl O. Carlson entitled, "Laser Film Deformation Recording and Erasing System," Ser. No. 585,060, filed Oct. 7, 1966.

Figure 2:
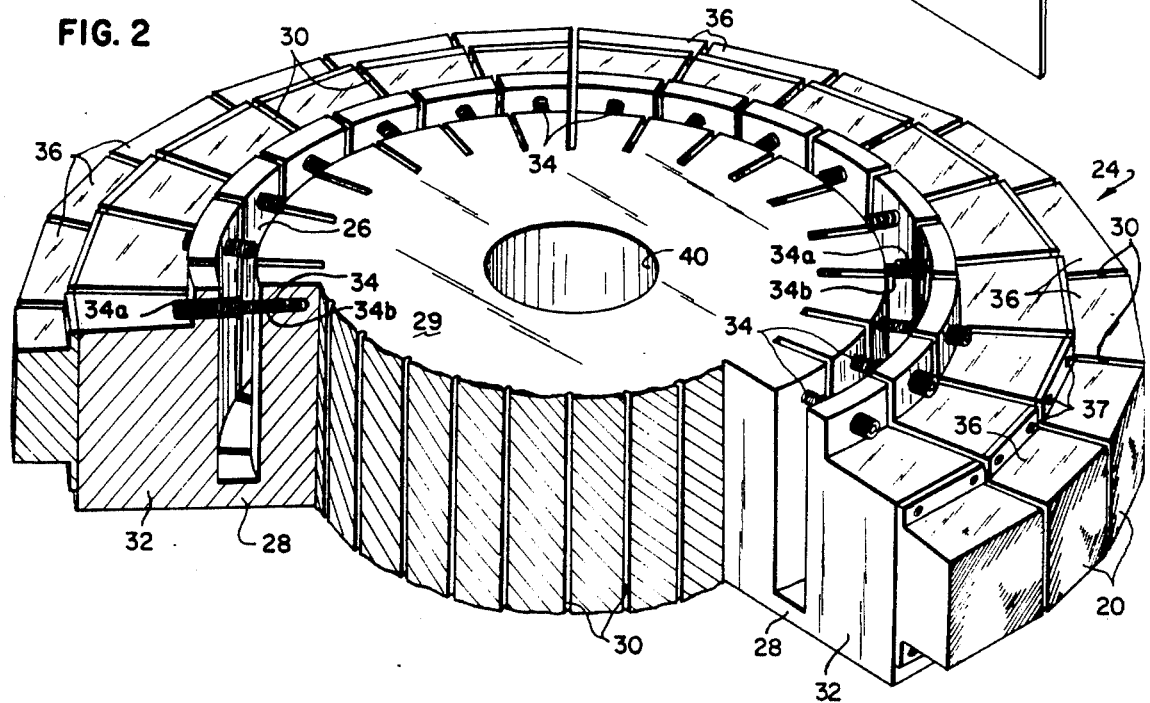
FIG. 2 illustrates a mirror assembly shown partially in section illustrating one embodiment of the invention.

One embodiment of the mirror assembly is shown in FIG. 2 of the drawings. A polygon block 24 is constructed from a suitable material as for example steel. A circular slot 26, spaced from the outer edge of the block, substantially reduces the cross section of that portion of the block, hereafter referred to as the connecting web 28, whereby the outer portion of the polygon block 24 can be flexed relative to the inner portion, which portion is hereafter referred to as the core portion 29. Radial cuts 30 provided at equal increments around the polygon block 24 divide said outer portion of the block into edge segments 32. Accordingly, each edge segment 32 is individually resiliently flexible around the connecting web 28. An adjusting screw 34 connects each of the edge segments 32 relative to the core portion 29 across the open end of the circular slot 26. The adjusting screw 34 is provided for example by a finely adjustable differential screw having threads 1/32 of an inch apart at one end 34a and having threads 1/30 of an inch apart at the other end 34b. Thus each full revolution of the differential adjusting screw will provide an adjustment of the outer segment relative to the core, i.e., a closure or opening of the gap provided by circular slot 26 of about 1/500 of an inch. A mirror element 36 having a mirror surface 20 is affixed to each edge segment as by fastening screws 37.

A bore 40 is provided in the center of the block 24 and is adapted to receive a drive spindle 41 which rotatively drives the block about its axis 43 (see FIG. 1), i.e., with the mirror surfaces 20 on the edge segments 32 rotating in a common plane. It will be further seen that by adjusting the adjusting screw 34 the angular relationship of the mirror surface to the axis of rotation 43 can be adjusted.

Figure 3:
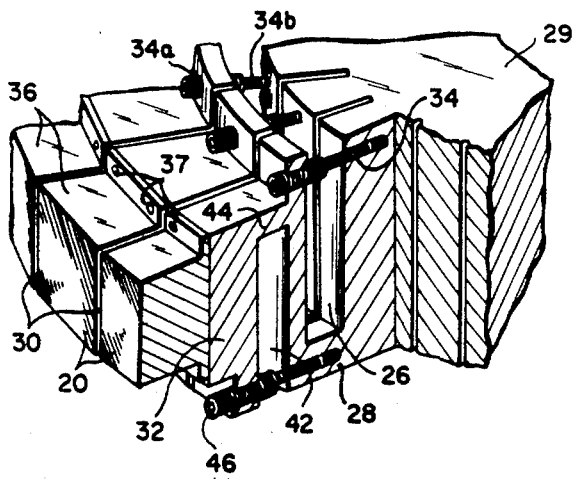
FIG. 3 is a view illustrating an alternate form of the mirror assembly shown in FIG. 2.

An alternate form of the above described mirror assembly shown in FIG. 2 is illustrated in FIG. 3. In addition to the circular slot 26 and flexible connecting web 28 provided near the outer edge of the block, a second circular slot 42 is provided from the other side of the block leaving a second flexible connecting web 44. A second differential adjusting screw 46 is provided across the gap formed by the slot 42 to enable an adjustment of the angle of the mirror surface 20 to the axis of rotation 43. Besides providing greater latitude in the adjustment of the mirror surface to the axis of rotation, the combined upper and lower angular adjustments enable adjustment of the distance between the mirror surfaces and the axis of rotation, i.e., simultaneous tightening of the adjusting screws 34 and 46 will draw the mirror toward the axis of rotation (while maintaining the angular disposition) to thereby shorten the radial distance between the axis of rotation and the mirror surface. Conversely if the adjusting screws are simultaneously loosened, the distance between the mirror surface and the axis of rotation will be lengthened.

Figure 4:
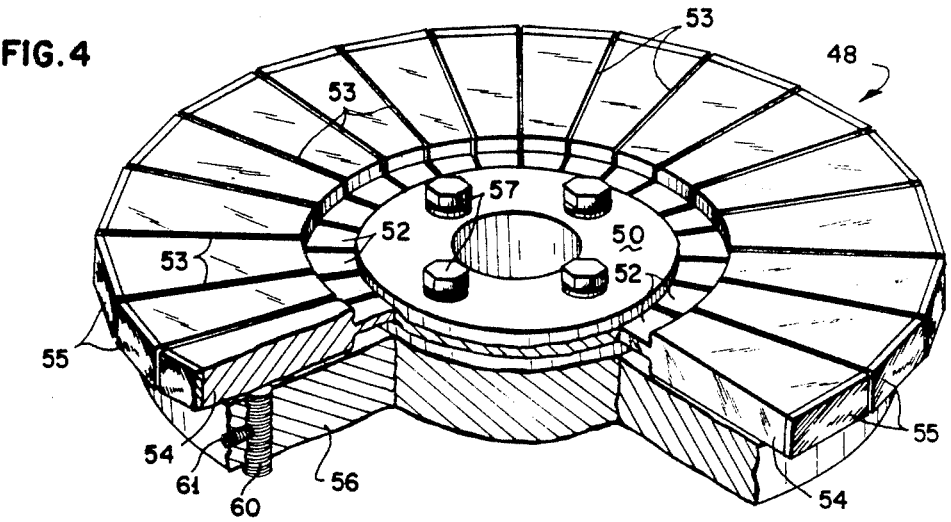
FIG. 4 is a mirror assembly shown partly in section illustrating a second embodiment of the invention.

A second embodiment of the invention is shown in FIG. 4 and is comprised of a polygon block 48 having a core portion 50, an annular section reduced in cross section on the upper and lower surface of core portion 50 which provides a flexible connecting web 52, and edge segments 54 separated by radial cuts 53. Mirror elements 55 are affixed by cement, for example, to the edge segments 54. A rigid circular plate 56 is securely connected to the core portion 50 by fastening screws 57. Adjusting screws 60 are threadably engaged with the rigid circular plate 56 and adapted to engage the respective edge segments 54. Adjustment of the adjusting screws 60 relative to the plate 56 will cause flexure of the respective edge segments 54 about the flexible connecting web 52. Such adjustment provides for the adjustment of the angle of the mirror surface of mirror element 55 relative to the axis of rotation. Upon determining the proper setting for the adjusting screw 60, a set screw 61 locks the position of the adjusting screw 60 to secure the angular position of the mirror surface.

Figure 5:
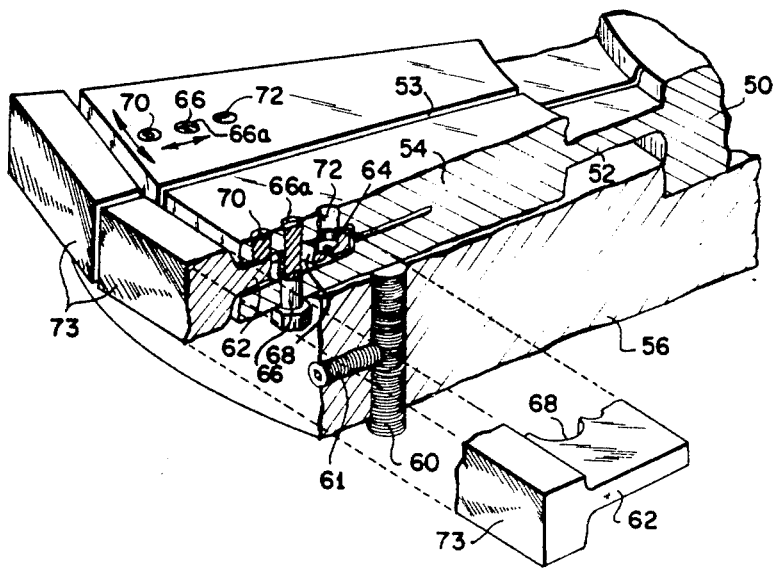
FIG. 5 is a view illustrating an alternate form of the mirror assembly shown in FIG. 4.

An alternate form of the second embodiment of the invention illustrated in FIG. 4 is shown in FIG. 5. Whereas in the embodiment as shown in FIG. 4, provision is made for adjustment only for the angular position of the mirror surfaces relative to axis of rotation, i.e., the pyramidal angle, the alternate embodiment of FIG. 5 provides for adjustment of the distance of the mirror surface to the axis of rotation and also adjustment of the angular position between the adjacent mirror surfaces. As shown in FIG. 5, mirror surfaces 73 are provided on wedge members 62 which are inserted in a radial slot 64 provided in the edge segments 54. Locking screws 66 passing through openings 66a in the walls of slot 64 are provided to tighten the slot 64 for locking the wedge members 62 in position relative to the edge segments 54. Oversized openings 68 in the wedge members 62, through which the locking screws 66 are inserted, enable the wedge members 62 to be adjusted when the locking screws 66 are loosened. A holding screw 70 is inserted into the edge segment 54 and engages the wedge members 62 to provide a pivot point around which the wedge member can be pivoted to adjust the face angle, i.e., the angle between the adjacent mirror surfaces. Loosening the holding screw 70 enables adjustment of the distance of the mirror surface with respect to the axis of rotation. The foregoing adjustments can be made, for example, by inserting a pointed tool through an opening 72 in the edge segment 54.

Figure 6:
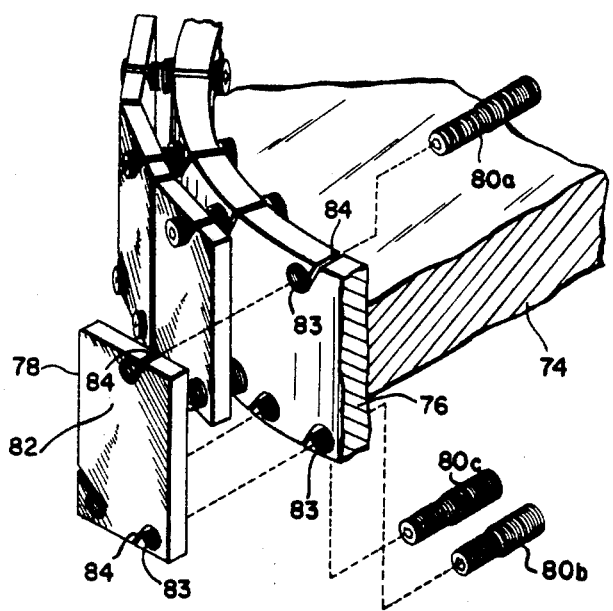
FIG. 6 is a view illustrating a third embodiment of the invention.

A third embodiment of the invention is illustrated in FIG. 6 of the drawings. A rigid core portion 74 has a collar 76 that is secured to the core portion as by shrink fitting. As illustrated, the collar 76 provides flanges protruding above and below the core portion around the periphery of the rigid core portion 74. Edge segments 78 are spaced from and connected to the collar 76 by differential screws 80a, 80b and 80c. As shown, screws 80a are threadably connected through the upper flange of the collar 76 to the top of the edge segments 78, and screws 80b and 80c are connected through the lower flange of the collar 76 to the bottom of the edge segments 78. The outer surfaces of the edge segments 78 are highly polished to form flat faced specularly reflective mirror surfaces 82. However, it will be understood that in the same manner as shown in FIG. 2, the mirror surfaces may be provided on separate mirror elements that are attached to the edge segments 78.

The threaded openings 83 in the collar 76 and edge segments 78 are made slightly smaller than the differential screws. For each of the threaded openings 83 a cut 84 is provided which extends tangentially from the opening in a clockwise direction to the edge of the flange or edge segment as the case may be. Thus, it will be seen that insertion of the differential screws into the threaded openings, forces a separation of the cut 84 to enlarge the opening to the dimensions of the screws. This insures a tight fit of the differential screws in the respective threaded openings.

The smaller ends of the differential screws 80a, 80b, and 80c are adapted to engage the threaded openings of the edge segments 78 whereas the larger ends are adapted to engage the threaded openings in the flanges of the collar 76. The smaller end of the differential screw is provided with the closer spaced threads and with the normal right hand threads being provided, it will be understood that, looking toward the center of the core portion, a clockwise turning of the screw will draw the edge segments toward the center.

The polygon mirror assemblies contemplated herein, for the most part are rotated at high speeds, e.g., from 1000 to 4000 revolutions per minute. The resulting centrifugal force will tend to separate the edge segments 78 from the core portion 74. Such separation requires a counterclockwise rotation of the differential screws. Such counterclockwise movement will be resisted by the locking effect produced by the urged closing of the tangential cut and thereby inhibit the undesired separation of the edge segments 78 from the core 74. A proper tool can be used to overcome such locking force where a separation is desired to adjust the position of the mirror surfaces.

The above embodiments of the invention are set forth to illustrate the invention only and are not intended to limit the scope thereof. Although it is not intended that this invention be bound to the following theory, it is believed that certain of the advantages derived from a polygon mirror assembly of the present invention are set forth hereafter.

With an apparatus of the present invention, the elements carrying the mirror surfaces, e.g., the edge segments, are firmly connected to a rigid core portion with resiliently resistive adjustable movement being permitted with a single degree of freedom only, i.e., the mirror is held fixed at at least two points that form a pivotal axis about which the mirror surface can be pivoted. Thus in the first embodiment of the invention shown in FIG. 2 the pivotal axis is located in the flexible connecting web 28, with pivotal movement precisely controlled by the fine adjustment of the differential screw 34. It is believed that at least in part, the precise control is achieved by the close tolerance provided because of the resistance of the web 28 to being flexed, i.e., when the edge segment 32 is pivoted. In the second embodiment of the invention shown in FIG. 4, the pivotal axis is located in the resiliently resistive flexible connecting web 52, with pivotal movement precisely controlled by the adjusting screw 60. In the third embodiment illustrated in FIG. 6 the pivotal axis is variable. Thus when the differential screw 80a is adjusted, the pivotal axis is defined by differential screws 80b and 80c. Similarly, screws 80a and 80b form the pivotal axis while screw 80c is adjusted, and screws 80a and 80c form the pivotal axis while screw 80b is adjusted. The ability of the threaded openings to expand because of the tangential cuts 84 provides resistive resilience such as is provided by the connecting web portions 28 and 52 of the first and second embodiments.

Other advantages of the illustrated apparatus include, for example, the convenient adjustability of the angular disposition of the mirror surfaces, and yet during use the position is secure. With slight modifications in the design, any number of angular adjustments can be provided. Still other advantages and modifications will be apparent to those skilled in the art without departing from the scope and spirit of the invention.

What is claimed is:

1. A polygon mirror assembly for producing repetitive scanning of a light beam reflected therefrom onto a recording medium comprising, a polygon block, mirror surfaces provided on the sides of the polygon block, said polygon block adapted to be mounted for rotation on an axis whereby the mirrors are rotated through a common plane, said polygon block having a circumferential segment that is reduced in thickness forming a circumferential cut therearound defining an inner core portion and an outer portion integrally connected thereto by a connecting web, said outer portion being segmented by a plurality of radial cuts to at least include said circumferential cut, each of said segments carrying one of the mirror surfaces such that said mirror surfaces surround said polgon block with the edge of each mirror surface adjacent to the edge of the succeeding mirror surface, said polygon block being rigid in the areas of full thickness and resiliently flexible at the connecting web, and adjusting means for inducing selective resistive pivotal movement of the outer portion segments about said connecting web for adjusting the angular disposition of the mirror surfaces carried by the edge segments relative to the axis of rotation.

2. A polygon mirror assembly for producing repetitive repetitive scanning of a light beam reflected therefrom onto a recording medium as defined in claim 1 wherein said adjusting means is provided by a differential adjusting screw extending across the open end of the cut and being threadably engaged with the core portion for drawing the free end of the outer portion segment toward or away from the core portion.

3. A polygon mirror assembly for producing repetitive scanning of a light beam reflected therefrom onto a recording medium as defined in claim 2 including, a second cut provided in the block from the side opposite the first cut to provide a second flexible connecting web, and a second differential screw extending across the open end of said second cut for adjusting the pivotal position of the outer portion segment about said second web whereby simultaneous adjusting of the two adjusting screws will provide adjustment of the distance between the axis of rotation and the mirror surface.

4. A polygon mirror assembly for producing repetitive scanning of a light beam reflected therefrom onto a recording medium as defined in claim 1 wherein, the core portion and outer portion segments are formed from an integral rigid block and the radial cuts separating the outer portion segments from each other and with the reduced thicknes of circumferential configuration between the core portion and outer portion segments porviding the flexible connecting web.

5. A polygon mirror assembly for producing repetitive scanning of a light beam reflected therefrom onto a recording medium as defined in claim 4 including, a rigid plate affixed to the core portion and protruding radially outward from the core portion to overlap the outer portion segments, said adjusting screw being threadably engaged with said rigid plate and passing therethrough for engagement with the outer portion segments whereby adjustment of said adjusting screw includes pivotal movement of the outer portion segments relative to the core portion.

6. A polygon mirror assembly for producing repetitive scanning of a light beam reflected therefrom onto a recording media as defined in claim 5 wherein each of said outer portion segments has a radial slot extending inwardly from its outer side, a wedge member on which the mirror surface is provided is adapted to be inserted into the slot, positioning means are provided to position the wedge in the radial slot for adjustment of the face angle and the distance of the mirror surface to the axis of rotation, and locking means are provided for locking the wedge securely at the adjusted position within the slot of the edge segment.

References Cited

UNITED STATES PATENTS

| | | | |
|---|---|---|---|
| 3,107,300 | 10/1963 | Stanley et al. | 350—6 X |
| 3,118,340 | 1/1964 | Iwerks | 350—299 X |
| 3,140,341 | 7/1964 | Holt | 350—299 X |
| 3,175,459 | 3/1965 | Smith et al. | 350—7 X |
| 3,407,018 | 10/1968 | Miller | 350—310 |
| 2,666,357 | 1/1954 | Graham et al. | 250—230 XR |
| 2,873,370 | 1/1959 | Neubrech et al. | 250—230 XR |
| 3,226,830 | 1/1966 | Everitt. | |
| 3,277,396 | 10/1966 | Statz et al. | 331—94.5 XR |
| 3,428,915 | 2/1969 | Leone et al. | 331—94.5 |

FOREIGN PATENTS

| | | |
|---|---|---|
| 1,146,667 | 10/1968 | Germany. |
| 405,507 | 8/1943 | Italy. |
| 922,582 | 2/1947 | France. |

PAUL R. GILLIAM, Primary Examiner

U.S. Cl. X.R.

350—6